United States Patent
Gibson et al.

(10) Patent No.: US 9,416,042 B2
(45) Date of Patent: Aug. 16, 2016

(54) HEXAGONAL TUBE STACKING METHOD FOR THE FABRICATION OF HOLLOW CORE PHOTONIC BAND GAP FIBERS AND PREFORMS

(75) Inventors: Daniel J. Gibson, Cheverly, MD (US); Jasbinder S. Sanghera, Ashburn, VA (US); Frederic H. Kung, Alexandria, VA (US); Ishwar D. Aggarwal, Fairfax Station, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 264 days.

(21) Appl. No.: 12/960,650

(22) Filed: Dec. 6, 2010

(65) Prior Publication Data

US 2012/0141080 A1    Jun. 7, 2012

(51) Int. Cl.
| | | |
|---|---|---|
| *C03B 37/023* | (2006.01) | |
| *G02B 6/032* | (2006.01) | |
| *C03B 37/012* | (2006.01) | |
| *G02B 6/02* | (2006.01) | |
| *C03B 37/027* | (2006.01) | |

(52) U.S. Cl.
CPC .......... *C03B 37/0122* (2013.01); *C03B 37/0124* (2013.01); *C03B 37/01248* (2013.01); *C03B 37/0279* (2013.01); *G02B 6/02371* (2013.01); *C03B 2201/60* (2013.01); *C03B 2201/80* (2013.01); *C03B 2201/86* (2013.01); *C03B 2203/10* (2013.01); *C03B 2203/14* (2013.01); *C03B 2203/16* (2013.01); *C03B 2203/42* (2013.01); *G02B 6/02328* (2013.01); *G02B 6/02347* (2013.01)

(58) Field of Classification Search
CPC ............ C03B 37/0122; C03B 37/0124; C03B 37/01248; C03B 37/0279; C03B 2201/60; C03B 2201/80; C03B 2201/86; C03B 2203/10; C03B 2203/14; C03B 2203/16; G02B 6/02371; G02B 6/02347
See application file for complete search history.

(56) References Cited

U.S. PATENT DOCUMENTS

| | | |
|---|---|---|
| 4,902,216 A | 2/1990 | Cunningham et al. |
| 5,774,779 A | 6/1998 | Tuchinskiy |
| 6,260,388 B1 | 7/2001 | Borrelli et al. |

(Continued)

OTHER PUBLICATIONS

Cregan, R.F., et al., "Single-Mode Photonic Band Gap Guidance of Light in Air", Science, vol. 285, pp. 1537-1539 (1999).

(Continued)

*Primary Examiner* — Michelle R Connelly
(74) *Attorney, Agent, or Firm* — US Naval Research Laboratory; Rebecca L. Forman

(57) ABSTRACT

The present invention is generally directed to a method of making a hollow-core photonic band gap preform from a specialty glass by pressing a specialty glass through a die to form a tube wherein the outer transverse shape of the tube is a hexagon, triangle, quadrilateral, or other polygon; stretching the tube to form a micro-tube with approximately the same outer transverse shape as the tube; stacking a plurality of micro-tubes into a bundle minimizing voids between adjacent micro-tubes and forming a central longitudinal void wherein the plurality of micro-tubes within the bundle comprise an inner structured region of the preform and the central void of the bundle comprises a hollow core in the preform; and inserting the bundle into a jacket tube. Also disclosed are the hollow-core photonic band gap preform and fiber formed by this method.

18 Claims, 8 Drawing Sheets

(56) References Cited

U.S. PATENT DOCUMENTS

| | | |
|---|---|---|
| 6,496,632 B2 | 12/2002 | Borrelli et al. |
| 6,847,771 B2 | 1/2005 | Fajardo et al. |
| 6,993,230 B2 | 1/2006 | Sanghera et al. |
| 7,077,900 B2 | 7/2006 | Park |
| 7,082,242 B2 | 7/2006 | Fajardo et al. |
| 7,099,533 B1 * | 8/2006 | Chenard .......... 385/31 |
| 7,295,740 B2 | 11/2007 | Sanghera et al. |
| 7,330,634 B2 | 2/2008 | Aitken et al. |
| 7,636,505 B2 | 12/2009 | Tassone |
| 7,873,251 B2 | 1/2011 | Bayya et al. |
| 8,196,435 B2 * | 6/2012 | Mukasa .......... B29D 11/00663 65/379 |
| 2003/0056550 A1 * | 3/2003 | Tanaka .......... C03B 37/0122 65/428 |
| 2003/0230118 A1 | 12/2003 | Dawes et al. |
| 2003/0231846 A1 * | 12/2003 | Fajardo et al. .......... 385/125 |
| 2004/0105641 A1 * | 6/2004 | Russell .......... B82Y 20/00 385/125 |
| 2004/0228592 A1 * | 11/2004 | Gaeta et al. .......... 385/125 |
| 2005/0074215 A1 | 4/2005 | Sanghera et al. |
| 2006/0230792 A1 | 10/2006 | Sanghera et al. |
| 2008/0060387 A1 | 3/2008 | Sanghera et al. |
| 2009/0220633 A1 | 9/2009 | Despa et al. |
| 2010/0303429 A1 | 12/2010 | Gibson et al. |
| 2010/0316856 A1 | 12/2010 | Currie et al. |
| 2011/0013268 A1 * | 1/2011 | Shaw .......... H01S 3/06741 359/341.1 |
| 2011/0121474 A1 * | 5/2011 | Russell .......... C03B 37/02781 264/1.24 |
| 2012/0141079 A1 * | 6/2012 | Gibson .......... C03B 37/0122 385/125 |
| 2012/0321263 A1 * | 12/2012 | Gibson .......... C03B 37/0122 385/125 |
| 2016/0041333 A1 * | 2/2016 | Gibson .......... C03B 37/0122 385/125 |

OTHER PUBLICATIONS

Barkou, S., et al., "Silica-Air Phtonic Crystal Fiber Design That Permits Waveguiding by a True Photonic Bandgap Effect", Optics Letters, vol. 24, No. 1, pp. 46-48 (1999).

Venkataraman, N., et al., "Low Loss (13 dB/km) Air Core Photonic Band-Gap Fibre", ECOC, Postdeadline Paper PD1.1, Sep. 2002.

* cited by examiner

HEXAGONAL TUBE STACKING METHOD FOR THE FABRICATION OF HOLLOW CORE PHOTONIC BAND GAP FIBERS AND PREFORMS

FIELD OF THE INVENTION

The present invention relates generally to photonic band gap fibers and preforms, and more specifically hexagonal tube stacking in hollow core photonic band gap fibers and preforms.

BACKGROUND OF THE INVENTION

Hollow core photonic band gap (HC-PBG) fibers have been fabricated from silica glass and reported in the literature. See, e.g., Cregan et al., "Single-mode photonic bad gap guidance of light in air," *Science*, 285(5433), 1537-1539 (1999); Barkou et al., "Silica-air photonic crystal fiber design that permits waveguiding by a true photonic bandgap effect." *Optics Letters*, 24(1), 46-48 (1999); Venkataraman et al., "Low loss (13 dB/km) air core photonic band-gap fibre," ECOC, Postdeadline Paper PD1. 1, Sep., 2002; and Venkataraman et al., "Microstructured optical fibers and preforms and methods for fabricating microstructured optical fibers," U.S. Pat. No. 6,847,771 (2005), the entire contents of each are incorporated herein by reference. FIG. 1 shows a schematic of the cross-section of a HC-PBG fiber. The periodic layered structure of holes and glass creates a photonic band gap that prevents light from propagating in the structured region (analogous to a 2D grating) and so light is confined to the hollow core. The core of the fiber in FIG. 1 takes the place of seven small holes in the center of the periodic structure, thus this arrangement is referred to as a 7-cell HC-PBG fiber. Similarly, a 19-cell HC-PBG fiber has a larger core, which takes the place of 19 small holes in the center of the periodic structure. Typically, the periodicity of the holes is on the scale of the wavelength of light and the outer glass is used for providing mechanical integrity to the fiber. The fact that light travels in the hollow core also means that the losses will be lower so longer path lengths can be used. Also, non-linear effects will be negligible and damage thresholds will be higher so that higher power laser energy can be transmitted through the fiber for military and commercial applications. Additionally, since light is guided in the hollow core, an analyte disposed therein will have maximum interaction with light, unlike traditional evanescent sensors.

The periodicity of the holes, the air fill fraction (defined by the ratio of void volume to solid material volume in the microstructured region, i.e., the region comprising the plurality of holes and solid material therebetween, and exclusive of the core and jacket regions), and the refractive index of the glass dictate the position of the photonic band gap, namely the transmission wavelengths confined to the hollow core and guided within the fiber. HC-PBG fibers are obtained by first making a structured preform and then drawing this into a microstructured fiber with the correct overall dimensions. The preform is typically comprised of a central structured region, which is typically made by stacking common circular tubes, which is inserted into a supportive common circular outer jacket tube. This assembly process inevitably introduces interstitial voids between the stacked tubes, which must be eliminated in the final fiber. These voids are similarly sized to the intended holes in the structured region of the preform, and run the entire length of the preform, therefore making fiberization difficult. This is especially true for specialty oxide and non-oxide glasses where the vapor pressure during fiberization may be sufficient to prevent collapse of these interstitial voids. Furthermore, the accuracy of the periodicity and position of the intended holes is important for bandgap guidance in the fiber, and is adversely affected by incorrect tube positioning and tube slippage during fiberization, which are common deficiencies of the tube stacking method using common circular tubes. Specialty glasses typically have much lower softening temperatures than silica glasses, making them more amiable to other forming processes such as extrusion, wherein tubes with arbitrary outer and inner transverse shapes can be fabricated and used both as stacking elements and as the supportive outer jacket. Silica glasses are not easily adaptable to extrusion, due to their high softening temperatures.

BRIEF SUMMARY OF THE INVENTION

The aforementioned problems are overcome in the present invention which provides a method of making a hollow-core photonic band gap preform from a specialty glass by pressing a specialty glass through a die to form a tube wherein the outer transverse shape of the tube is a hexagon, triangle, quadrilateral, or other polygon; stretching the tube to form a micro-tube with approximately the same outer transverse shape as the tube; stacking a plurality of micro-tubes into a bundle minimizing voids between adjacent micro-tubes and forming a central longitudinal void wherein the plurality of micro-tubes within the bundle comprise an inner structured region of the preform and the central void of the bundle comprises a hollow core in the preform; and inserting the bundle into a jacket tube. Also disclosed are the hollow-core photonic band gap preform and fiber formed by this method.

The HC-PBG fibers and preforms of the present invention may be used in facility clean up, biomedical analysis (e.g., glucose, blood, breath, etc.), chemical and biological weapon agent detection, toxic and hazardous chemical detection, environmental pollution monitoring and process control, etc. In addition to chemical sensing, the HC-PBG fibers may be used for very high laser power delivery since the light is predominantly guided in the hollow core, unlike in traditional fibers, which possess a solid core that will be damaged at high powers. The present invention may be used in high power infrared missile warning systems. Furthermore, these HC-PBG fibers may reduce system complexity, weight, and cost and enable remoting of high power lasers for cutting, welding and metrology, as well as laser surgery, cancer removal and glaucoma treatment. Infrared lasers for biomedical applications include the $CO_2$ laser where powers of 10 to 50 W are needed and cannot be transmitted using current solid core fibers.

There are no HC-PBG fibers reported using specialty glasses. This is partly due to the intolerance of the HC-PBG structure to interstitial voids and lattice errors. Unfortunately, the high (in comparison to silica) vapor pressure common in specialty glasses makes the removal of interstitial voids difficult in the case of round tube stacking. Hexagonal tube stacking offers advantages, namely design flexibility and rapid prototyping, not available using alternative methods. Hexagonal tube stacking offers distinct advantages over the common round tube stacking method, by reducing interstitial voids and lattice error due to tube sliding. Hexagonal tube stacking also offers flexibility for rapid prototyping of experimental microstructured fiber designs.

These and other features and advantages of the invention, as well as the invention itself, will become better understood

DETAILED DESCRIPTION OF THE INVENTION

According to the present invention, a structured hollow-core photonic bandgap (HC-PBG) preform and microstructured HC-PBG fiber are fabricated from specialty non-silica glasses using a tube-stacking method, wherein the tubes being stacked have a hexagonal or nearly hexagonal outer transverse shape. The preform consists of a central longitudinal void (hollow core), and inner structured region disposed around and exclusive of the central void, and an outer jacket region disposed around and exclusive of the inner structured region.

Figure 2:
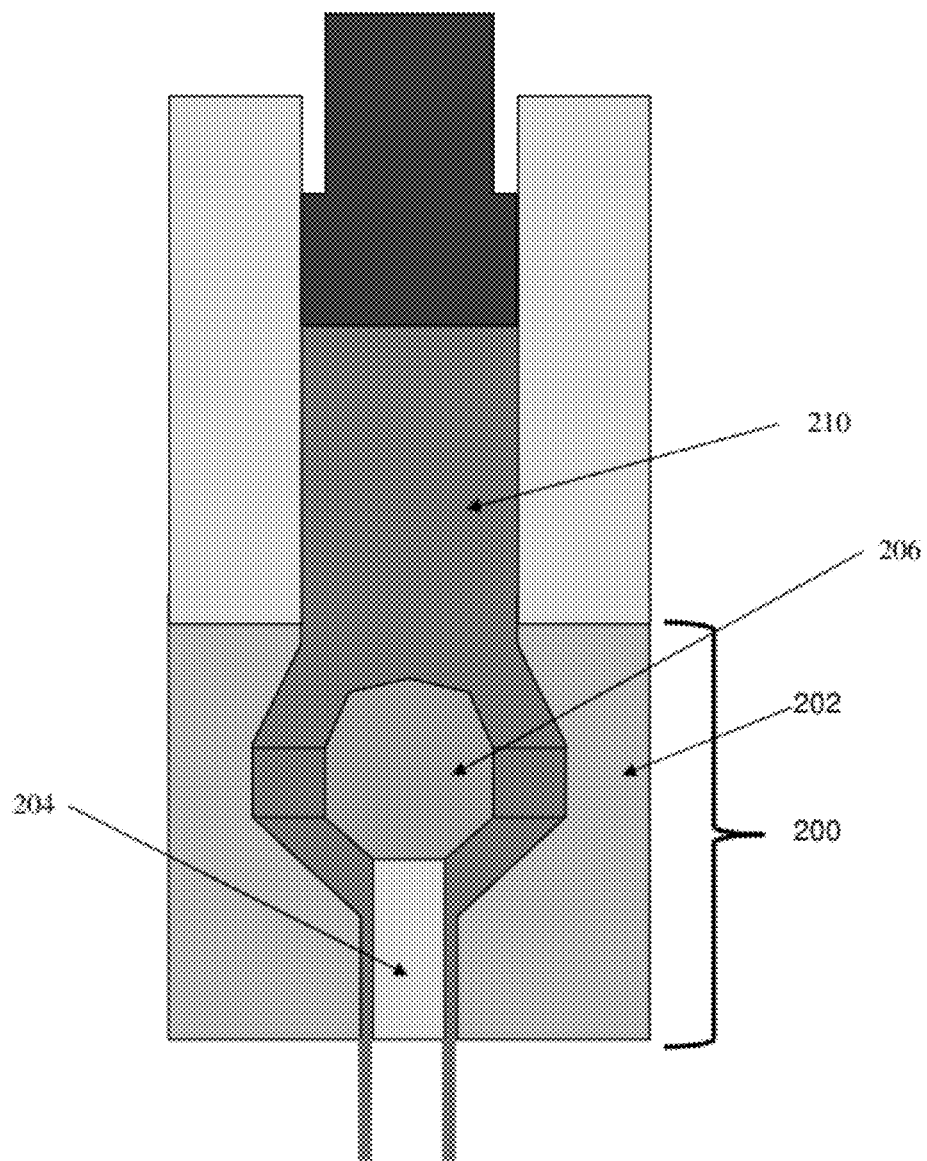
FIG. 2 is a schematic of an extrusion method for fabricating specialty glass tubes with arbitrary inner and outer transverse shapes. Means of heating are not shown for clarity.

As shown in FIG. 2, a bulk rod of specialty glass 210 is forced through a die 200 that is designed to reshape the transverse cross section of the glass rod and impart a central longitudinal hole. The die 200 comprises an outer portion 202, a central mandrel 204, and a mandrel support 206. The die 200 is designed with channels in a specific arrangement to allow for the passage and direction of the softened glass 210 around the mandrel support 206 and into the space between the mandrel 204 and the outer portion of the die 202. The die 200 should be fabricated from a material that is compatible with the glass to be extruded, and this material may be stainless steel, graphite, silica, or another material, which may or may not be coated with another material, and which is unreactive or minimally reactive to the glass 210. The glass 210, die 200, or both may be heated during or prior to extrusion to reduce the viscosity of the glass.

The specialty glass is formed into a tube upon exiting the die. This tube should have an outer transverse shape matching, either exactly or approximately, that of the outer portion of the die, with an inner transverse shape, that is the transverse shape of the longitudinal hole in the tube, that matches, either exactly or approximately, that of the die mandrel. The outer transverse shape of the extruded tube could be such that when multiple tubes are stacked against one another, the space between the tubes (interstitial void), when compared to tubes with round outer transverse shapes is greatly reduced or practically eliminated. Such outer transverse shapes include hexagon, triangle, quadrilateral, or other polygon, either exact or approximate. The inner transverse shape of the extruded tube could be round, approximately round, or a polygon (exactly or approximately). The selection of the outer and inner transverse shapes can be independent of each other. The largest dimension of the outer transverse shape of the extruded tube (i.e., its circumscribed diameter), casually referred to as its outer diameter, should be larger than about 1 mm and smaller than about 50 mm.

Figure 3:
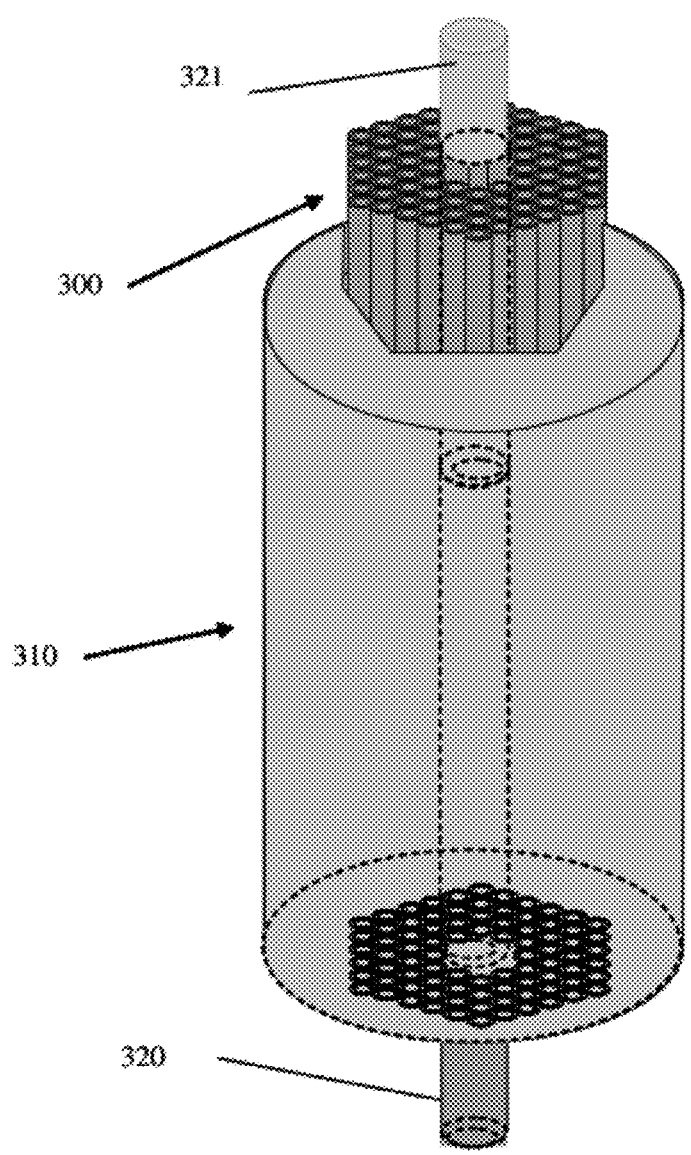
FIG. 3 is a schematic of an assembled preform prior to the consolidation step wherein a 2-part sacrificial core has been inserted into the central void. The sacrificial core lower portion is soluble in a selected reagent, while the micro-tube, jacket tube and sacrificial core upper portion are insoluble in said reagent.
Figure 4:
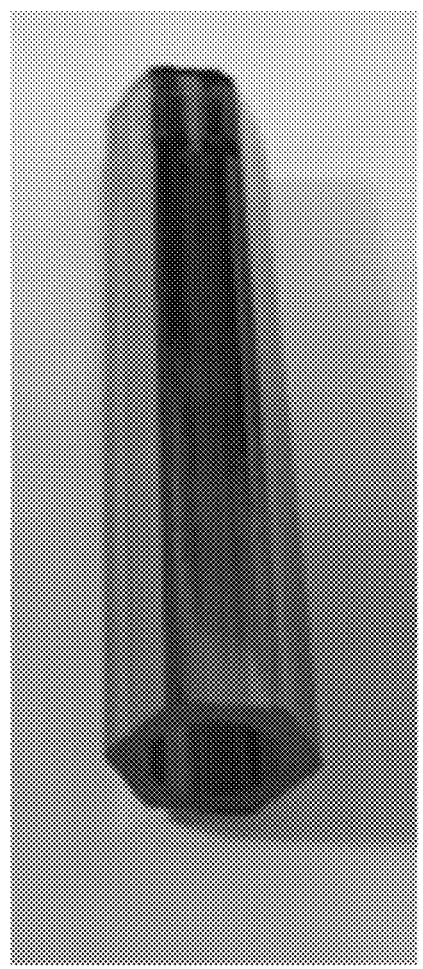
FIG. 4 shows an extruded arsenic sulfide tube having a hexagonal outer transverse shape and a circular inner transverse shape.
Figure 5:
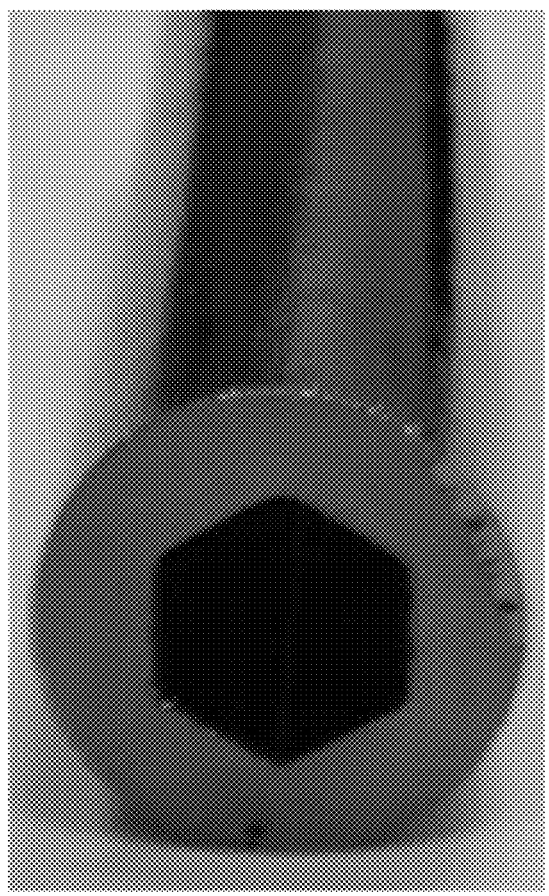
FIG. 5 shows an extruded arsenic selenide jacket tube having a circular outer transverse shape and a hexagonal inner transverse shape.
Figure 6:
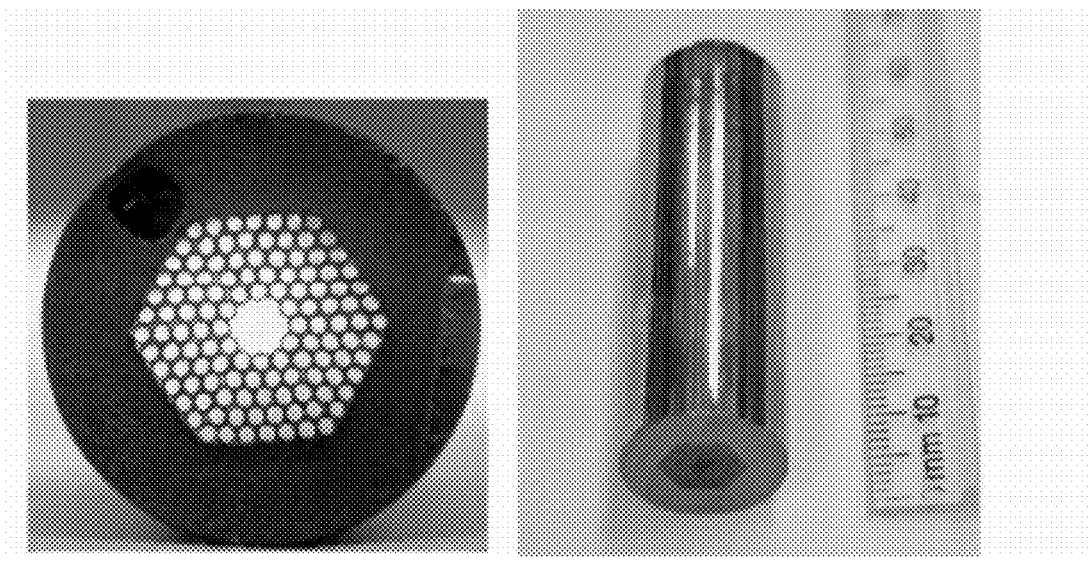
FIG. 6 shows an end view (6a) and isometric view (6b) of an arsenic sulfide "loose" 7-cell HC-PBG preform comprised of an outer jacket tube having round outer and hexagonal inner transverse shapes, a plurality of micro-tubes having hexagonal outer and round inner transverse shapes and a central void having a polygonal transverse shape.
Figure 7:
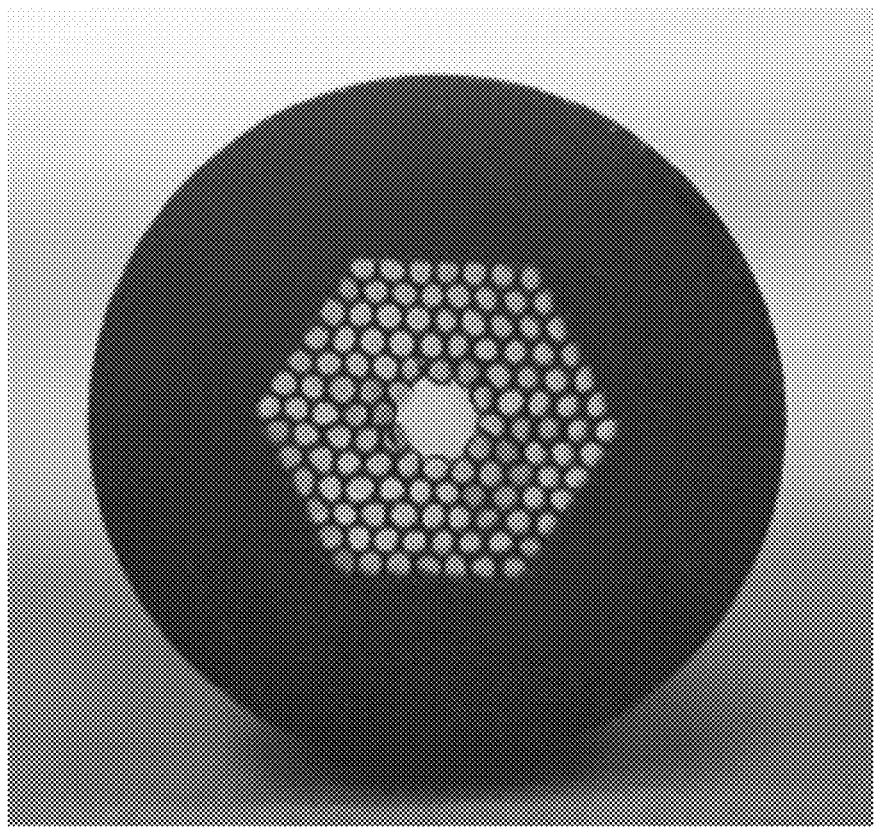
FIG. 7 shows an end view of an arsenic sulfide "consolidated" 7-cell HC-PBG preform wherein the jacket tube has fused to the adjacent micro-tubes and individual adjacent micro-tubes have fused to each other.
Figure 8:
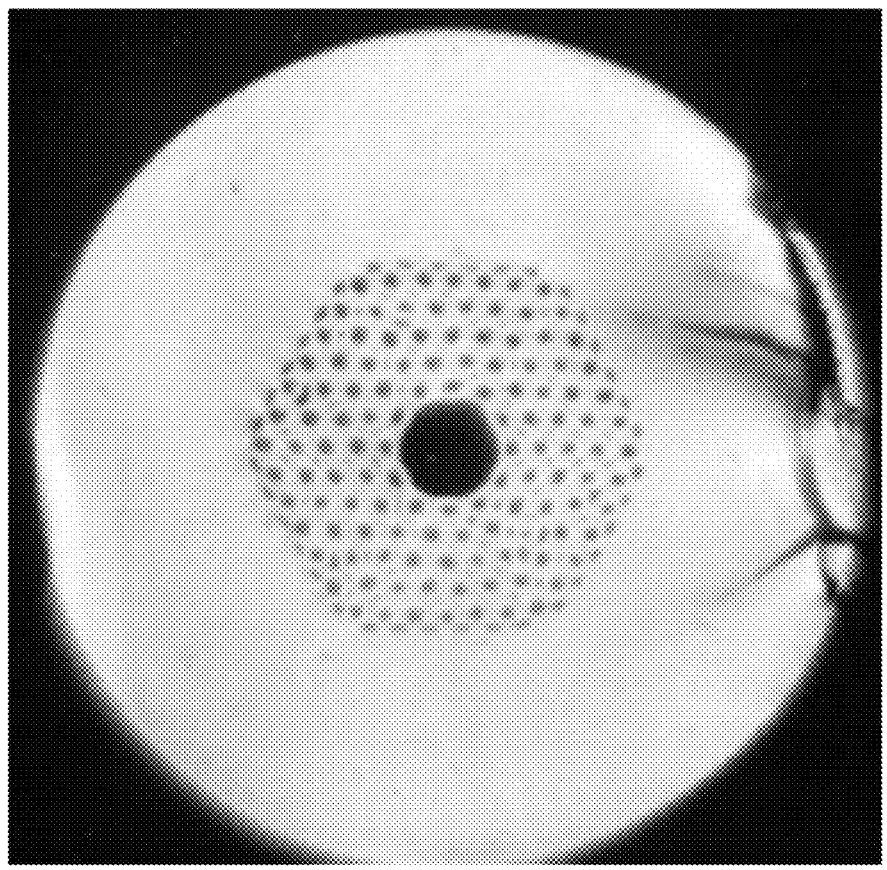
FIG. 8 shows an arsenic sulfide, 7-cell, HC-PBG fiber drawn from a consolidated HC-PBG preform. The fiber is not optimized.

The extruded tube is then stretched, for example, on a fiber draw tower into a tube with smaller outer and inner diameters but approximately the same outer and inner transverse shapes forming lengths of micro-tube. This stretching step could take place in-situ with the extrusion step, such that no intermediate extruded tube is fabricated, or as a separate step taking place after the extrusion step. The micro-tubes are then stacked into a bundle in an arrangement such that the voids between adjacent tubes are minimized, and a central longitudinal void is established, in an arrangement as shown in FIG. 3. The plurality of micro-tubes 300 within the bundle comprises the inner structured region of the preform; the central void of the bundle comprises the hollow core in the preform. The bundle is then inserted into a jacket tube 310 having an approximately circular outer transverse shape and an inner transverse shape that approximately conforms to the outer transverse shape of the bundle, forming an assembled or loose HC-PBG preform. The inner transverse shape of the jacket tube may be, exactly or approximately, a circle, square, hexagon, or other polygon such that approximate conformity to the bundle is achieved. This jacket tube can be fabricated by extruding specialty glass through a specially shaped die, consisting of an outer portion, a mandrel and a mandrel support, in a manner similar to that used for fabricating the extruded tubes just described, or by rotational casting, grinding or other means. The jacket tube comprises the outer jacket region in the assembled HC-PBG preform.

The assembled or loose HC-PBG preform may or may not undergo a separate consolidation step wherein the preform is heated, either in whole or in part, either at once or sequentially in parts, so that adjacent micro-tubes fuse to one another and to the jacket tube, if they happen to be adjacent to it, while maintaining, in whole or in part, the inner transverse shapes of the individual micro-tubes and of the core, while reducing or eliminating any voids between adjacent micro-tubes (interstitial voids) and reducing to eliminating any voids between the jacket tube and adjacent micro-tubes, such that the preform becomes a consolidated HC-PBG preform. This consolidation step can entail, for example, heating the entire assembled preform to a temperature near or above the softening temperature of the glass for a predetermined time and then cooling, or for example feeding the preform through a heat zone, for example inside a draw furnace, at some fixed rate. A radially compressive stress may or may not be applied to the jacket tube, if needed, to assist in the consolidation step. It may be advantageous to insert a well-fitting rod or tube of a different material, called a sacrificial core, inside the central void of the assembled preform, prior to the consolidation step, such that the micro-tubes do not shift during consolidation. The sacrificial core may be made from a material having a softening temperature near or greater than that of the specialty glass comprising the micro-tubes, and may be a glass, metal, polymer, or any mixture thereof. The sacrificial core is to be removed from the consolidated preform, either through physical means (e.g., pulling or drilling) or through chemical means (e.g., dissolution). It may be desirable that the material comprising (in whole or in part) the sacrificial core be strongly solvable in, for example, an acid solution, if the specialty glass comprising the micro-tubes and the jacket tube is insoluble in said acid solution. Furthermore, it may be desirable for a portion of the sacrificial core to remain in tact, for use as part of a pressure isolation system during the drawing step (see, e.g., Sanghera et al., "Fabrication of high air fraction photonic band gap fibers," U.S. Patent Application No. 2005/0074215 (2005), the entire contents of which are incorporated herein by reference), and as such the sacrificial core can consist of multiple parts and comprise more than one material, and may protrude from one or both ends of the assembled preform. A schematic of this configuration is shown in FIG. 3. As an example, one portion of the sacrificial core 320 may be made from a borosilicate glass, such that it dissolves quickly in a strong acid, while another portion 321 may be made from a fluoropolymer such that it resists dissolution in said strong acid. In this example, the consolidated preform retains a protruding section of sacrificial core (the fluoropolymer) after consolidation and sacrificial core removal.

The consolidated HC-PBG preform is then stretched, for example, on a fiber draw tower at a temperature corresponding to a glass viscosity in the range of about $10^4$ to $10^6$ poises, into HC-PBG fiber with considerably smaller dimensions than the preform. The fiber outer diameter is typically less than about 1 mm and more typically less than about 500 μm, although a microstructured cane, with an outer diameter typically greater than about 1 mm, and more typically between about 1.5 and 4 mm, may also be fabricated by this method.

The present invention pertains to HC-PBG fibers made from non-silica based specialty glasses such as chalcogenide glasses including sulfides, selenides, tellurides, and any mixture thereof, as well as chalcohalide glasses and other oxide glasses, including specialty silicates, germanates, phosphates, borates, gallates, tellurites, and any mixture thereof. Fabrication of the HC-PBG preforms using the hexagonal tube stacking technique is only one example of fabricating these microstructured preforms. Other techniques such as direct extrusion, templating, laser machining, chemical etching, or mechanical drilling of glass, any combination of these methods, and other glass forming and shaping techniques may be used to fabricate the HC-PBG preforms.

Figure 1:
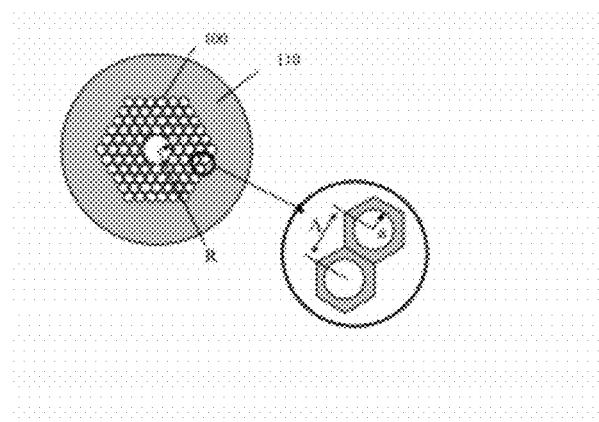
FIG. 1 is a schematic of the transverse cross-section of a hollow-core photonic bandgap (HC-PBG) fiber.

The method of fabricating HC-PBG preforms by stacking hexagonal tubes is not limited to the type of structure shown in FIG. 1, but can also be used for more complex structures. The method can also be applied to structures wherein microtubes with outer transverse shapes other than hexagonal or jacket tubes with different inner transverse shapes would be more appropriate, for example a microstructured fiber with holes in a square lattice arrangement. In addition, the sizes, and even the shapes, of the individual micro-tubes may or may not be the same, so that a combination of micro-tubes with several different sizes and/or shapes may be used in one structured preform and microstructured fiber as appropriate. Additionally, controlling the wall thickness as well as the size of the tubes can lead to control of the hole structure and/or air-fill fraction by using different combinations of sizes etc. Such tubes and micro-tubes would also be fabricated using extrusion and stretching on a fiber draw tower as described above.

EXAMPLES

A chalcogenide glass tube having a hexagonal outer transverse shape and a circular inner transverse shape was fabricated by extrusion. This example comprises an arsenic sulfide based glass and was extruded at a temperature of about 280° C. through an appropriately designed stainless steel die. The largest dimension of the outer transverse shape (circumscribed diameter measured corner-to-corner) was 16.5 mm and its length was about 15 cm.

A chalcogenide glass tube having a circular outer transverse shape and a hexagonal inner transverse shape was fabricated by extrusion. This example comprises an arsenic selenide based glass and was extruded at a temperature of about 280° C. through an appropriately designed stainless steel die. The outer diameter of this tube was about 16 mm and its length was about 9 cm.

An assembled chalcogenide glass, 7-cell HC-PBG preform was fabricated. It is so called since the core region is missing the equivalent of 7 micro-tubes. This preform is "loose" in that it has not been consolidated by means of a heat-treatment step, in other words the individual elements and jacket tube have not been fused to one another. The preform is comprised on an outer jacket tube, which was extruded and has a circular outer transverse shape and hexagonal inner transverse shape, a plurality of micro-tubes, having hexagonal outer transverse shapes and circular inner transverse shapes and a central void having a polygonal transverse shape. The micro-tubes were fabricated by stretching the extruded tube with a hexagonal outer transverse shape and a circular inner transverse shape described above on a fiber optic draw tower and have a transverse circumscribed diameter of about 700 μm. The outer transverse diameter of the assembled preform is about 16 mm.

A consolidated chalcogenide glass, 7-cell HC-PBG preform was made. This preform was fabricated by heat-treating the "loose" preform described above such that the jacket tube has fused to the adjacent micro-tubes and the individual adjacent micro-tubes have fused to each other. The outer transverse diameter of the consolidated preform is about 15 mm.

A chalcogenide glass, 7-cell HC-PBG fiber was fabricated from an arsenic sulfide based glass. This fiber is about 300 μm in diameter with an approximately 30 μm core, surrounded by a plurality of approximately 4 μm diameter holes. The consolidated HC-PBG preform, from which this fiber was drawn, was assembled from an extruded jacket tube, having a circular outer transverse shape and hexagonal inner transverse shape, and a plurality of micro-tubes, having hexagonal outer transverse shapes and circular inner transverse shapes and stretched from a like-shaped extruded tube, and was heat treated to fuse the elements.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A method making a hollow-core photonic band gap preform from a non-silica specialty glass, comprising the steps of:

extruding the non-silica specialty glass to form a tube wherein the outer transverse shape of the tube is a hexagon, triangle, quadrilateral, or other polygon;

stretching the tube to form a micro-tube with approximately the same outer transverse shape as the tube;

stacking a plurality of micro-tubes into a bundle minimizing voids between adjacent micro-tubes and forming a central longitudinal void wherein the plurality of micro-tubes within the bundle comprise an inner structured region of the preform and the central void of the bundle comprises a hollow core in the preform;

inserting the bundle into a jacket tube; and forming a consolidated preform by heating the jacketed bundle to the softening temperature of the non-silica specialty glass so the micro-tubes fuse to each other and to the jacket tube while maintaining the inner transverse shape of each micro-tube and of the core of the preform while reducing voids between adjacent micro-tubes and between the jacket tube and the micro-tubes.

2. The method of claim 1, wherein the specialty glass comprises chalcogenide glass, chalcohalide glass, oxide glass, germanate glass, phosphate glass, borate glass, gallate glass, tellurite glass, or any combination thereof.

3. The method of claim 1, wherein the largest dimension of the outer transverse shape of the tube is between 1 and 55 mm.

4. The method of claim 1, additionally comprising stretching the consolidated preform into a hollow-core photonic band gap fiber.

5. The method of claim 1, wherein the fiber outer diameter is less than 1 mm.

6. The method of claim 1, wherein a rod or tube is inserted inside the hollow core of the preform before heating and removed after consolidation.

7. The method of claim 6, wherein the rod or tube comprises more than one part and at least one part remains in the core of the consolidated preform for drawing into a fiber.

8. The method of claim 1, additionally comprising stretching the consolidated preform into a hollow-core photonic band gap fiber.

9. The method of claim 8, wherein the fiber outer diameter is less than 1 mm.

10. A hollow-core photonic band gap preform made by the method of claim 1.

11. The preform of claim 10, wherein the specialty glass comprises chalcogenide glass, chalcohalide glass, oxide glass, germanate glass, phosphate glass, borate glass, gallate glass, tellurite glass, or any combination thereof.

12. The preform of claim 10, wherein the largest dimension of the outer transverse shape of the tube is between 1 and 55 mm.

13. The preform of claim 10, additionally comprising stretching the consolidated preform into a hollow-core photonic band gap fiber.

14. The preform of claim 13, wherein the fiber outer diameter is less than 1 mm.

15. The preform of claim 10, wherein a rod or tube is inserted inside the hollow core of the preform before heating and removed after consolidation.

16. The preform of claim 15, wherein the rod or tube comprises more than one part and at least one part remains in the core of the consolidated preform for drawing into a fiber.

17. The preform of claim 10, additionally comprising stretching the consolidated preform into a hollow-core photonic band gap fiber.

18. The preform of claim 17, wherein the fiber outer diameter is less than 1 mm.

* * * * *